US012742396B2

(12) United States Patent
Tully et al.

(10) Patent No.: US 12,742,396 B2
(45) Date of Patent: Sep. 22, 2026

(54) TRANSITION DUCT FOR GAS TURBINE ENGINE

(71) Applicant: Siemens Energy Global GmbH & Co. KG, Munich (DE)

(72) Inventors: Landon Tully, Charlotte, NC (US); Jaishree Sharma, Oviedo, FL (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 19/106,792

(22) PCT Filed: Aug. 16, 2023

(86) PCT No.: PCT/US2023/030364
§ 371 (c)(1),
(2) Date: Feb. 26, 2025

(87) PCT Pub. No.: WO2024/085941
PCT Pub. Date: Apr. 25, 2024

(65) Prior Publication Data
US 2026/0063042 A1 Mar. 5, 2026

(51) Int. Cl.
*F01D 9/02* (2006.01)
*F01D 5/14* (2006.01)
*F01D 11/00* (2006.01)
*F23R 3/00* (2006.01)

(52) U.S. Cl.
CPC ............. *F01D 9/023* (2013.01); *F01D 5/143* (2013.01); *F01D 11/005* (2013.01); *F01D 5/145* (2013.01); *F05D 2240/12* (2013.01); *F23R 3/002* (2013.01)

(58) Field of Classification Search
CPC ........ F01D 9/023; F01D 11/005; F01D 5/143; F01D 5/145; F02C 7/28; F23R 3/42; F23R 3/44; F23R 3/46; F23R 3/50; F23R 3/60
See application file for complete search history.

(56) References Cited

U.S. PATENT DOCUMENTS 2,647,369 A * 8/1953 Leduc ........................ F23R 3/08 60/39.5
2,704,440 A * 3/1955 Nicholson ............... F23R 3/346 60/737
(Continued)

FOREIGN PATENT DOCUMENTS

GB 2361302 A * 10/2001 ............. F01D 9/023
JP 2012207621 A * 10/2012 ................ F02C 7/28

OTHER PUBLICATIONS

PCT International Search Report and Written Opinion of International Searching Authority mailed May 23, 2024 corresponding to PCT International Application No. PCT/US2023/030364 filed Aug. 16, 2023.

*Primary Examiner* — Alain Chau
(74) *Attorney, Agent, or Firm* — Ye Ren

(57) ABSTRACT

A transition duct includes a liner defining an inlet opening and an outlet opening, and an exit frame connected to the liner and disposed around a perimeter of the outlet opening. The exit frame includes a first side panel, a second side panel, an outer diameter panel disposed between the first side panel and the second side panel, an inner diameter panel disposed between the first side panel and the second side panel, and a middle bump extending from the inner diameter panel toward the outer diameter panel.

19 Claims, 5 Drawing Sheets

(56) References Cited

U.S. PATENT DOCUMENTS

| | | | | |
|---|---|---|---|---|
| 2,780,060 A * | 2/1957 | Griffith | ..................... | F23R 3/16<br>60/752 |
| 6,860,108 B2 * | 3/2005 | Soechting | ................. | F02C 7/28<br>60/800 |
| 11,067,277 B2 * | 7/2021 | Correia | ..................... | F02C 7/28 |
| 2018/0100433 A1 * | 4/2018 | Correia | ..................... | F23R 3/16 |

* cited by examiner

TRANSITION DUCT FOR GAS TURBINE ENGINE

BACKGROUND

A gas turbine engine typically includes a compressor section, a turbine section, and a combustion section disposed therebetween. The compressor section includes multiple stages of rotating compressor blades and stationary compressor vanes. The combustion section typically includes a plurality of combustors. The turbine section includes multiple stages of rotating turbine blades and stationary turbine vanes. The combustor produces and directs hot exhaust gas to the turbine section. The hot exhaust gas may be ingested into a gap between the combustor and turbine inlet.

BRIEF SUMMARY

In one aspect, a transition duct includes a liner defining an inlet opening and an outlet opening, and an exit frame connected to the liner and disposed around a perimeter of the outlet opening. The exit frame includes a first side panel, a second side panel, an outer diameter panel disposed between the first side panel and the second side panel, an inner diameter panel disposed between the first side panel and the second side panel, and a middle bump extending from the inner diameter panel toward the outer diameter panel.

In one aspect, a transition duct includes a liner defining an inlet opening and an outlet opening, an exit frame connected to the liner, the exit frame defining an inner perimeter edge that surrounds the outlet opening, a middle bump extending from the inner perimeter edge into the outlet opening, a left side bump disposed at a left side of the middle bump and extending from the inner perimeter edge into the outlet opening. and a right side bump disposed at a right side of the middle bump and extending from the inner perimeter edge into the outlet opening.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
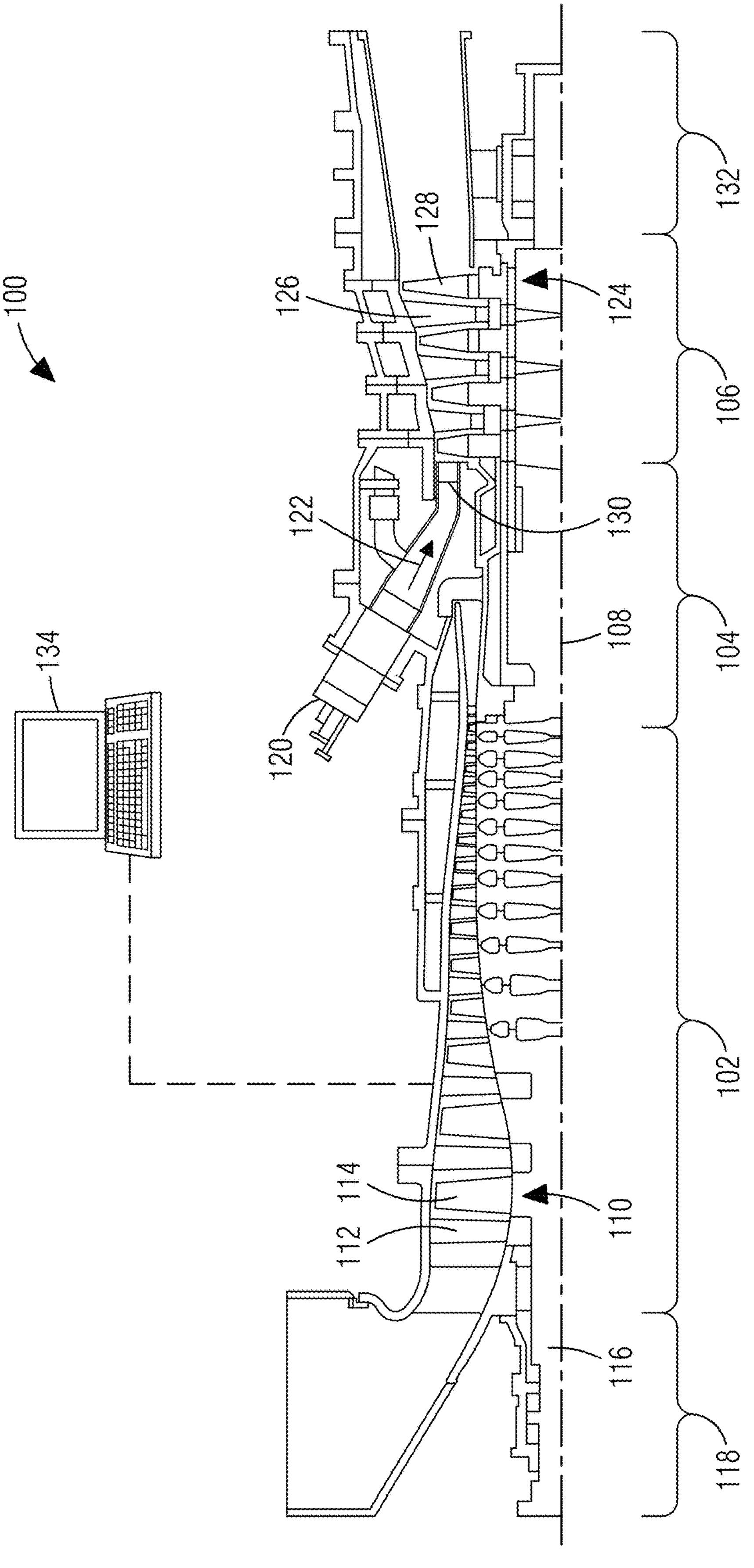
FIG. 1 is a longitudinal cross-sectional view of a gas turbine engine taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

Also, in the description, the terms "axial" or "axially" refer to a direction along a longitudinal axis of a gas turbine engine. The terms "radial" or "radially" refer to a direction perpendicular to the longitudinal axis of the gas turbine engine. The terms "downstream" or "aft" refer to a direction along a flow direction. The terms "upstream" or "forward" refer to a direction against the flow direction.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 108. The compressor section 102 includes a plurality of compressor stages 110 with each compressor stage 110 including a set of stationary vanes 112 or adjustable guide vanes and a set of rotating blades 114. A rotor 116 supports the rotating blades 114 for rotation about the central axis 108 during operation. In some constructions, a single one-piece rotor 116 extends the length of the gas turbine engine 100 and is supported for rotation by a bearing at either end. In other constructions, the rotor 116 is assembled from several separate spools that are attached to one another or may include multiple disk sections that are attached via a bolt or plurality of bolts.

The compressor section 102 is in fluid communication with an inlet section 118 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustors 120 that each operate to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of stationary turbine vanes 126 and a number of rotating turbine blades 128. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other device to be driven. As with the compressor section 102, other designs and arrangements of the turbine section 106 are possible.

An exhaust portion 132 is positioned downstream of the turbine section 106 and is arranged to receive the expanded flow of exhaust gas 122 from the final turbine stage 124 in the turbine section 106. The exhaust portion 132 is arranged to efficiently direct the exhaust gas 122 away from the turbine section 106 to assure efficient operation of the turbine section 106. Many variations and design differences are possible in the exhaust portion 132. As such, the illustrated exhaust portion 132 is but one example of those variations.

A control system 134 is coupled to the gas turbine engine 100 and operates to monitor various operating parameters and to control various operations of the gas turbine engine 100. In preferred constructions the control system 134 is typically micro-processor based and includes memory devices and data storage devices for collecting, analyzing, and storing data. In addition, the control system 134 provides output data to various devices including monitors, printers, indicators, and the like that allow users to interface with the control system 134 to provide inputs or adjustments. In the example of a power generation system, a user may input a power output set point and the control system 134 may adjust the various control inputs to achieve that power output in an efficient manner.

The control system 134 can control various operating parameters including, but not limited to variable inlet guide vane positions, fuel flow rates and pressures, engine speed, valve positions, generator load, and generator excitation. Of course, other applications may have fewer or more controllable devices. The control system 134 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

Figure 2:
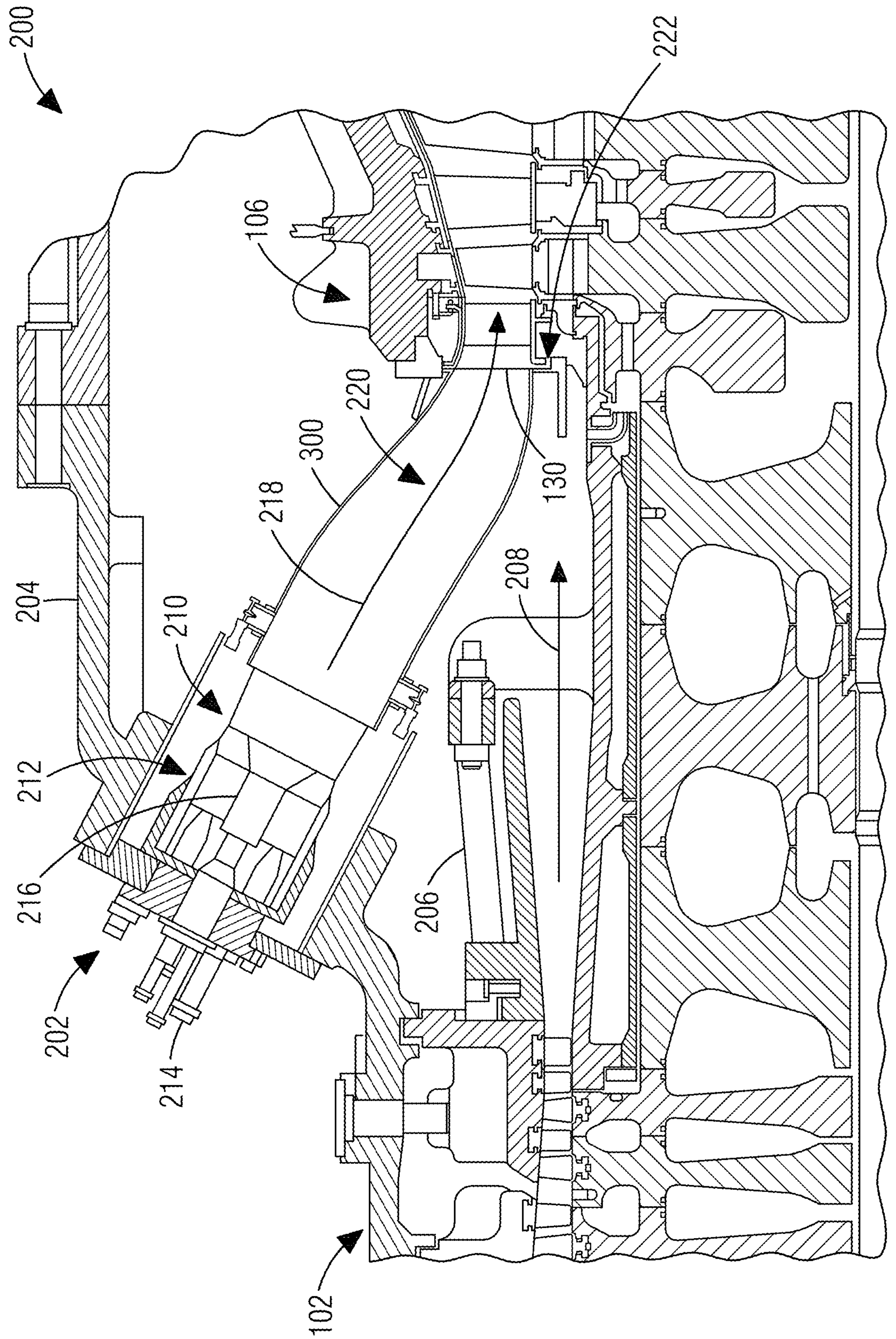
FIG. 2 is a longitudinal cross-sectional view of a combustion section of the gas turbine engine of FIG. 1.

FIG. 2 illustrates a longitudinal cross-sectional view of a combustion section 200 suitable for use in the gas turbine engine 100 of FIG. 1. The combustion section 200 may replace the combustion section 104 of FIG. 1.

The combustion section 200 includes a casing 204 and a plurality of combustors 202 that are enclosed by the casing 204. The plurality of combustors 202 are arranged circumferentially around the central axis 108 of the gas turbine engine 100 and spaced apart from each other to define a can-type combustor, with other arrangements being possible. The plurality of combustors 202 are enclosed by the casing 204. A compressor exit diffusor 206 is connected to the exit of the compressor section 102 for providing compressed air 208 to the combustor 202.

Each combustor 202 of the illustrated construction includes a head-end section 210 that is connected to a transition duct 300. The head-end section 210 includes a premixer fuel injector 212 that includes a premixer fuel supply tube 214 and a pilot burner 216. The premixer fuel supply tube 214 injects fuel to the combustor 202. The fuel is mixed with the compressed air 208 and is ignited by the pilot burner 216 for producing exhaust gas 218. Other arrangements of the combustor 202 are possible.

The transition duct 300 defines an interior 220 through which the exhaust gas 218 passes. The transition duct 300 is adjacent to the turbine inlet 130. The exhaust gas 218 exits the transition duct 300 and enters the turbine section 106 through the turbine inlet 130. A gap 222 exists between the transition duct 300 and the turbine inlet 130. A portion of the exhaust gas 218 may be ingested into the gap 222. A purge air may be used to reduce the amount of the exhaust gas 218 ingested into the gap 222. The purge air includes the compressed air 208.

Figure 3:
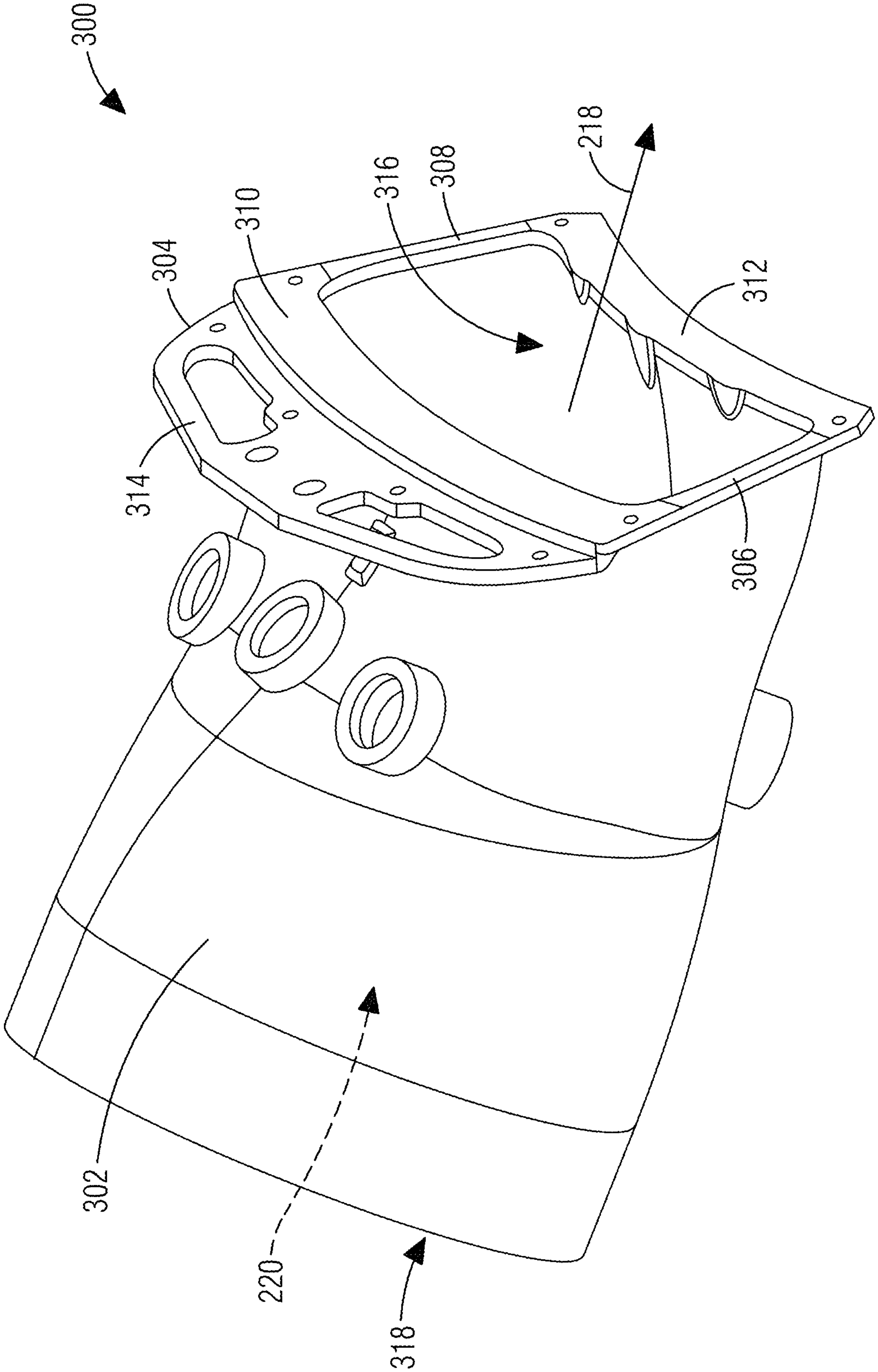
FIG. 3 a perspective view of a transition duct shown in FIG. 2.

FIG. 3 illustrates a perspective view of the transition duct 300. The transition duct 300 includes a liner 302 that surrounds the interior 220. The liner 302 defines an inlet opening 318 and an outlet opening 316. The transition duct 300 has an exit frame 304 that is connected to the liner 302 and disposed around a perimeter of the outlet opening 316.

The exit frame 304 includes a first side panel 306, a second side panel 308, an outer diameter panel 310 disposed between the first side panel 306 and the second side panel 308, and an inner diameter panel 312 disposed between the first side panel 306 and the second side panel 308. A frame head 314 is disposed over and extends out from the outer diameter panel 310. The first side panel 306, the second side panel 308, the outer diameter panel 310, and the inner diameter panel 312 surround the outlet opening 316. The exhaust gas 218 exits the transition duct 300 through the outlet opening 316 and enters the turbine section 106.

The outer diameter panel 310, the inner diameter panel 312, the first side panel 306, and the second side panel 308 are formed as a single piece. In other constructions, the inner diameter panel 312, the first side panel 306, and the second side panel 308 may be formed as separated pieces and connected to each other, such as by welding.

Figure 4:
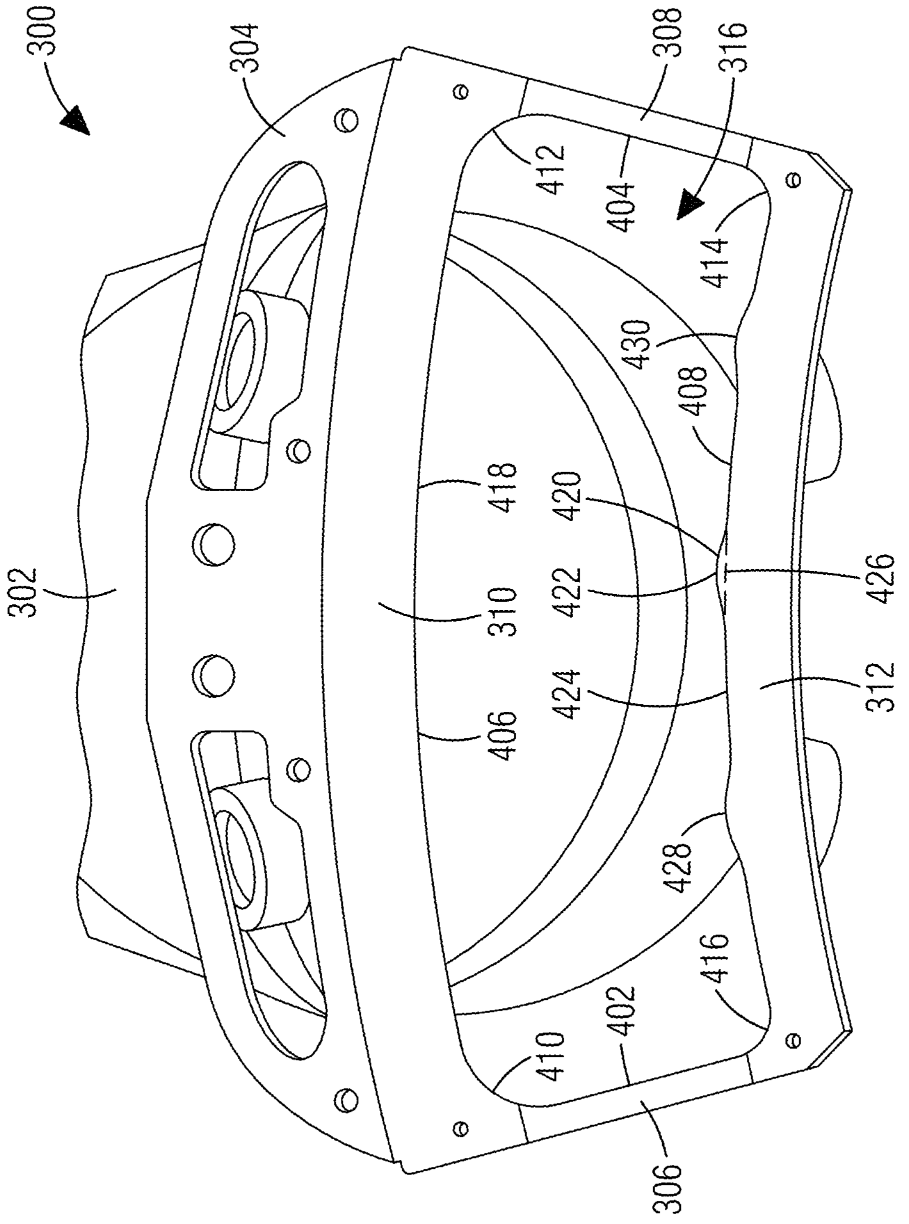
FIG. 4 is a portion of the perspective view of the transition duct shown in FIG. 3 better illustrating an exit frame.

FIG. 4 illustrates a portion of the perspective view of the transition duct 300 shown in FIG. 3 better illustrating the exit frame 304. The first side panel 306 defines a first side edge 402. The second side panel 308 defines a second side edge 404. The outer diameter panel 310 defines an outer edge 406. The inner diameter panel 312 defines an inner edge 408.

The outer edge 406 joins the first side edge 402 by a first outer edge fillet 410 and joins the second side edge 404 by a second outer edge fillet 412. The inner edge 408 joins the first side edge 402 by a first inner edge fillet 416 and joins the second side edge 404 by a second inner edge fillet 414. The first side edge 402, the first outer edge fillet 410, the outer edge 406, the second outer edge fillet 412, the second side edge 404, the second inner edge fillet 414, the inner edge 408, and the first inner edge fillet 416 cooperate to define an inner perimeter edge 418. The inner perimeter edge 418 surrounds the outlet opening 316. The first outer edge fillet 410 and the second outer edge fillet 412 are defined by a non-circular elliptical curve. The first inner edge fillet 416 and the second inner edge fillet 414 are defined by a circular elliptical curve. In other constructions, the first outer edge fillet 410, the second outer edge fillet 412, the first inner edge fillets 416, and the second inner edge fillet 414 may be defined by any shapes of curves to meet a requirement of the gas turbine engine 100.

The inner edge 408 includes a middle bump 420, a left side bump 428 disposed at a left side of the middle bump 420, a right side bump 430 disposed at a right side of the middle bump 420, and a non-bump portion 424. The middle bump 420 extends out from the inner diameter panel 312 to a radial peak 422 toward the outer diameter panel 310. The non-bump portion 424 extends out from the inner diameter panel 312 and extends between the first side panel 306 and the second side panel 308 along a curve. The curve follows a second order polynomial. The middle bump 420 has a height that is measured from the radial peak 422 of the middle bump 420 to an inner edge projection 426 beneath the middle bump 420. The radial peak 422 is in the same plane of the inner diameter panel 312. The height of the middle bump 420 is between 3 mm to 30 mm. The left side bump 428 has a height that is measured the same way as the middle bump 420. The right side bump 430 has a height that is measured the same way as the middle bump 420. The middle bump 420, the left side bump 428, and the right side bump 430 have the same height. In other constructions, the inner edge 408 may include fewer than three bumps or more than three bumps and/or other dimensions of bump heights to meet a requirement of the gas turbine engine 100.

Figure 5:
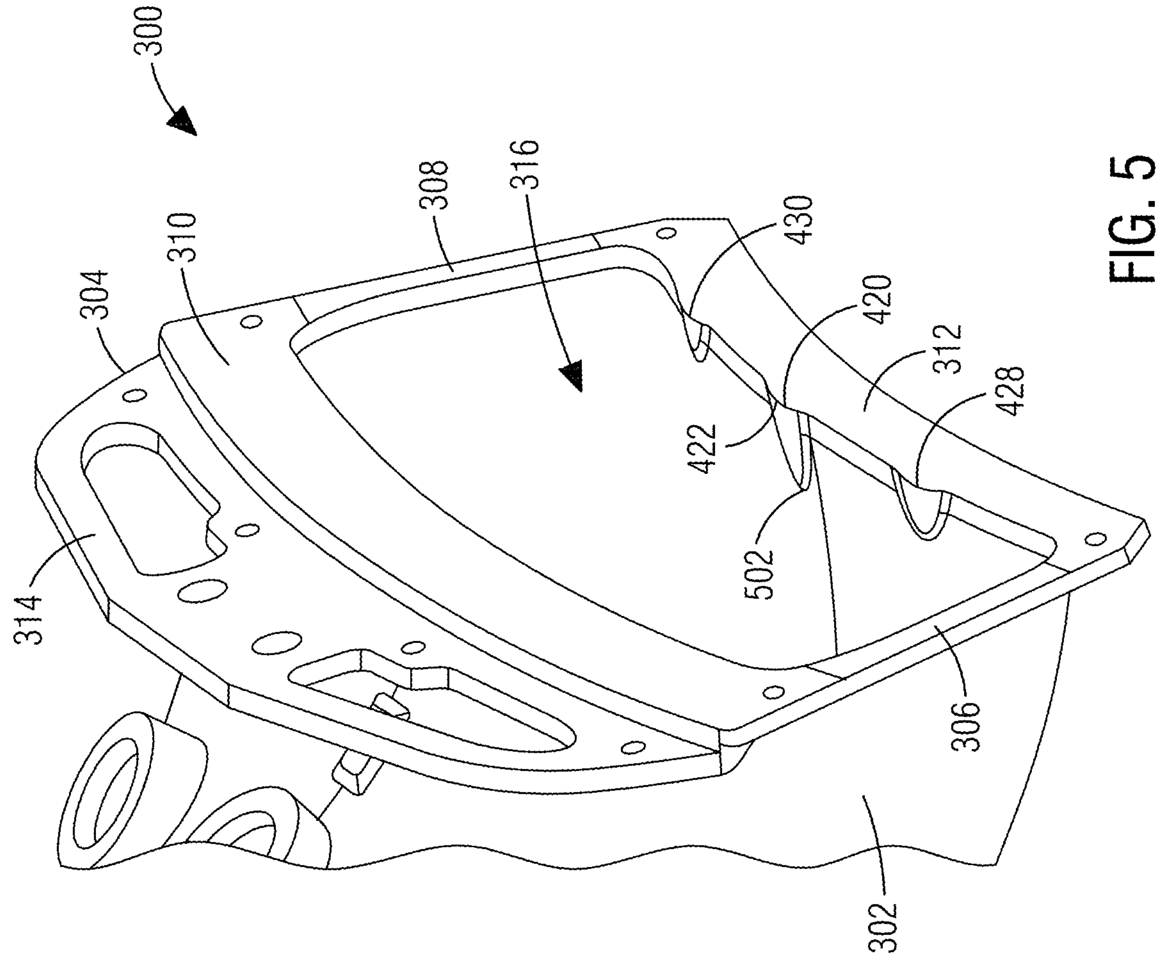
FIG. 5 is a portion of the perspective view of the transition duct shown in FIG. 3 better illustrating bumps.

FIG. 5 illustrates a portion of the perspective view of the transition duct 300 shown in FIG. 3 better illustrating the middle bump 420, the left side bump 428, and the right side bump 430. The middle bump 420 extends out from the inner diameter panel 312 to a lateral peak 502 toward the head-end section 210 of the combustor 202 (shown in FIG. 2). The middle bump 420 has a depth that is measured from the lateral peak 502 of the middle bump 420 perpendicular to the inner diameter panel 312. The lateral peak 502 is disposed on the liner 302. The left side bump 428 has a depth that is measured the same way as the middle bump 420. The right side bump 430 has a depth that is measured the same way as the middle bump 420.

In the construction shown in FIG. 5, the middle bump 420 has a depth that is greater than a depth of the left side bump 428 and a depth of the right side bump 430. The depth of the left side bump 428 is equal to the depth of the right side bump 430. In other constructions, the bumps may have different depths, for example, the depth of the middle bump 420 is equal to or less than the depth of the left side bump 428 and/or the depth of the right side bump 430, or the depth of the left side bump 428 may be different than the depth of the right side bump 430.

Each of the middle bump 420, the left side bump 428, and the right side bump 430 has a tapered surface that tapers from the inner diameter panel 312 to the lateral peak 502 and tapers from the radial peak 422 to the lateral peak 502 forming a wedge shape. The middle bump 420, the left side bump 428, and the right side bump 430 are solid. In other constructions, the middle bump 420, the left side bump 428, and the right side bump 430 may be hollow or may be formed from a sheet material and welded to the inner diameter panel 312 and the liner 302 as desired.

In operation, with reference to FIG. 1 to FIG. 5, the middle bump 420, the left side bump 428, and the right side bump 430 of the inner diameter panel 312 define a contour that reduces a quantity of the exhaust gas 218 ingested into the gap 222 between the transition duct 300 and the turbine inlet 130. Thus, an amount of the purge air that is used to purge the exhaust gas 218 out of the gap 222 is reduced. The purge air includes the compressed air 208. As such, a performance of the combustors 120 is improved and emission of the combustors 120 is reduced. The first outer edge fillet 410 that joins the outer diameter panel 310 with the first side panel 306 and the second outer edge fillet 412 that joins the outer diameter panel 310 with the second side panel 308 have a non-circular elliptical shape that reduces a deformation of a gap between the outer diameter panel 310 and the stationary turbine vane 126 at the turbine inlet 130 such that a uniform circumferential radial gap is maintained.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words “means for” are followed by a participle.

LISTING OF DRAWING ELEMENTS

100 gas turbine engine
102 compressor section
104 combustion section
106 turbine section
108 central axis
110 compressor stage
112 stationary vane
114 rotating blade

116 rotor
118 inlet section
120 combustor
122 exhaust gas
124 turbine stage
126 stationary turbine vane
128 rotating turbine blade
130 turbine inlet
132 exhaust portion
134 control system
200 combustion section
202 combustor
204 casing
206 compressor exit diffusor
208 compressed air
210 head-end section
212 premixer fuel injector
214 premixer fuel supply tube
216 pilot burner
218 exhaust gas
220 interior
222 gap
300 transition duct
302 liner
304 exit frame
306 first side panel
308 second side panel
310 outer diameter panel
312 inner diameter panel
314 frame head
316 outlet opening
318 inlet opening
402 first side edge
404 second side edge
406 outer edge
408 inner edge
410 first outer edge fillet
412 second outer edge fillet
414 second inner edge fillet
416 first inner edge fillet
418 inner perimeter edge
420 middle bump
422 radial peak
424 non-bump portion
426 inner edge projection
428 left side bump
430 right side bump
502 lateral peak

What is claimed is:

1. A transition duct comprising:
a liner defining an inlet opening and an outlet opening; and
an exit frame connected to the liner and disposed around a perimeter of the outlet opening, the exit frame comprising:
a first side panel;
a second side panel;
an outer diameter panel disposed between the first side panel and the second side panel;
an inner diameter panel disposed between the first side panel and the second side panel; and
a middle bump disposed on the exit frame,
wherein the middle bump extends from the inner diameter panel to a radial peak toward the outer diameter panel,
wherein the radial peak is in the same plane as the inner diameter panel,
wherein the middle bump extends from the inner diameter panel to a lateral peak toward the inlet opening,
wherein the lateral peak is disposed on the liner, and
wherein the middle bump has a radially tapered surface that tapers continuously from the radial peak at the inner diameter panel of the exit frame to the lateral peak.

2. The transition duct of claim 1, wherein the inner diameter panel defines an inner edge that includes a non-bump portion and the middle bump.

3. The transition duct of claim 2, wherein the non-bump portion extends between the first side panel and the second side panel along a curve that is defined by a second order polynomial.

4. The transition duct of claim 2, wherein a height of the middle bump is measured from the radial peak of the middle bump to a projection of the inner edge beneath the radial peak.

5. The transition duct of claim 4, wherein the height of the middle bump is between 3 mm to 30 mm.

6. The transition duct of claim 4, further comprising a left side bump positioned at a left side of the middle bump and a right side bump positioned at a right side of the middle bump, wherein a height of the left side bump is measured from a radial peak of the left side bump to a projection of the inner edge beneath the radial peak of the left side bump and a height of the right side bump is measured from a radial peak of the right side bump to a projection of the inner edge beneath the radial peak of the right side bump, and wherein the height of the left side bump and the height of the right side bump are equal to the height of the middle bump.

7. The transition duct of claim 1, further comprising a left side bump positioned at a left side of the middle bump, wherein a depth of the middle bump is measured from the lateral peak of the middle bump to the inner diameter panel, wherein a depth of the left side bump is measured from a lateral peak of the left side bump to the inner diameter panel, and wherein the depth of the middle bump is greater than the depth of the left side bump.

8. The transition duct of claim 7, further comprising a right side bump positioned at a right side of the middle bump, wherein a depth of the right side bump is measured from a lateral peak of the right side bump to the inner diameter panel, and wherein the depth of the left side bump is equal to the depth of the right side bump.

9. The transition duct of claim 1, wherein the outer diameter panel defines an outer edge and the first side panel defines a first side edge, wherein the outer edge and the first side edge are joined by a first outer edge fillet, and wherein the first outer edge fillet is defined by a non-circular elliptical curve.

10. The transition duct of claim 1, wherein the middle bump has a laterally tapered surface that tapers continuously from the inner diameter panel of the exit frame to the lateral peak.

11. A transition duct comprising:
a liner defining an inlet opening and an outlet opening;
an exit frame connected to the liner, the exit frame defining an inner perimeter edge that surrounds the outlet opening;
a middle bump disposed on the exit frame;
a left side bump disposed at a left side of the middle bump; and
a right side bump disposed at a right side of the middle bump,
wherein the middle bump extends from the inner perimeter edge to a radial peak into the outlet opening, wherein the radial peak is in the same plane as the inner perimeter edge, wherein the middle bump extends from the exit frame to a lateral peak toward the inlet opening, wherein the lateral peak is disposed on the liner, and wherein the middle bump has a radially tapered surface that tapers continuously from the radial peak at the inner perimeter edge of the exit frame to the lateral peak.

12. The transition duct of claim 11, wherein the inner perimeter edge includes an inner edge, and wherein the middle bump, the left side bump, and the right side bump extend from the inner edge.

13. The transition duct of claim 12, wherein the inner edge, the middle bump, the left side bump, and the right side bump cooperate to define a continuous curve.

14. The transition duct of claim 12, wherein the inner perimeter edge includes a first side edge and a second side edge, wherein the inner edge extends from the first side edge to the second side edge and includes a non-bump portion, the middle bump, the left side bump, and the right side bump.

15. The transition duct of claim 14, wherein the non-bump portion has a curve that is defined by a second order polynomial.

16. The transition duct of claim 12, wherein a height of the middle bump is measured from the radial peak of the middle bump to a projection of the inner edge beneath the radial peak, and wherein the height is between 3 mm to 30 mm.

17. The transition duct of claim 11, wherein a depth of the middle bump is measured from the lateral peak of the middle bump to the exit frame, wherein a depth of the left side bump is measured from a lateral peak of the left side bump to the exit frame, and wherein the depth of the middle bump is greater than the depth of the left side bump.

18. The transition duct of claim 17, wherein a depth of the right side bump is measured from a lateral peak of the right side bump to the exit frame, and wherein the depth of the left side bump is equal to the depth of the right side bump.

19. The transition duct of claim 11, wherein the inner perimeter edge includes an outer edge and a first side edge, wherein the outer edge and the first side edge are joined by a first outer edge fillet, and wherein the first outer edge fillet is defined by a non-circular elliptical curve.

* * * * *